INVENTOR.
GERALD L. KRETCHMAN
BY
Richard G. Geib
ATTORNEY

United States Patent Office 3,541,282
Patented Nov. 17, 1970

3,541,282
SWITCH FOR MASTER CYLINDER
Gerald L. Kretchman, St. Joseph, Mich., assignor to The Bendix Corporation, a corporation of Delaware
Filed Jan. 26, 1968, Ser. No. 700,918
Int. Cl. H01h 35/38
U.S. Cl. 200—82                                    8 Claims

ABSTRACT OF THE DISCLOSURE

A switch between piston elements of a hydraulic actuator which is adapted to close an electrical circuit through the housing of the actuator in the normal position, which switch is inclusive of elements which may be operated to open the electrical circuit.

SUMMARY

Hydraulic actuators such as the split system master cylinder is being employed in present day automobiles in view of the national safety legislation requirements have unique disadvantage known to those skilled in the art. This centers around the fact that if there is a failure in one side of the split system, there is hardly any way the operator of the brake pedal can realize the fact that one side of the system has failed.

It has been the desire, therefore, of practioners to incorporate warning devices sensitive to hydraulic pressure developments within each of the sections of the split system which, for the most part, all generally compare the pressure from each side of the split master cylinder to utilize the working pressure to actuate a piston to close switch contacts in event of a failure in the development of hydraulic pressure for one or the other sections. Such failure devices have been known in the art since the issuance of U.S. Pat. No. 2,046,316, and they have been greatly simplified since then, as illustrated in U.S. Pat. No. 3,011,595.

Other types of known prior art devices for indicating a failure in a split system type Master-Vac may be seen in U.S. Pat. Nos. 3,067,842 and 2,694,191, as examples of tying in such failure indicating devices with the abnormal travel of one or the other of the pistons in the split master cylinder. However, these systems involve complicated additional structures to be added to a vehicle braking system, and with regard to split system master cylinders of the type being employed today would not generally be effective to provide the failure indication. This is because the split master cylinders of today's utilization involve floating secondary pistons operatively related to primary pistons by a cage spring assembly so that the separate pressures may be developed within a common bore by an application to a single push rod of force from a brake pedal.

It is therefore the principal intent of this invention to provide a switching device within a master cylinder of the type being employed in today's automobiles which is simple and therefore economical and which references any abnormal travel of the primary piston with reference to the secondary piston as well as any abnormal travel of the secondary piston in the master cylinder, so as to be a better gage of failure indicating means than simply trying to balance working pressures across a piston controlling a switch.

DESCRIPTION

Further objects and advantages of this invention will appear from the following description of the drawings in which.

Figure 1:
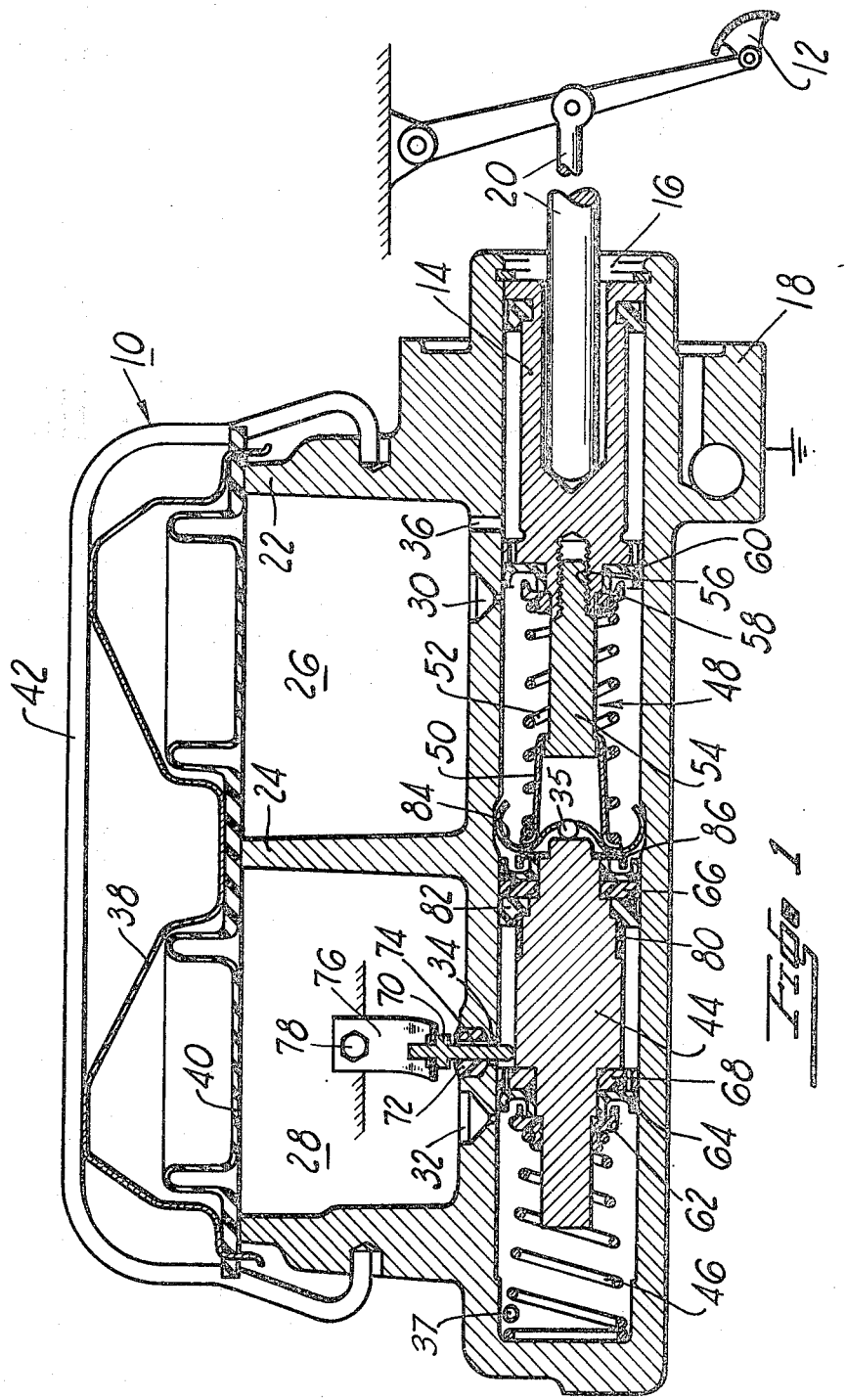
FIG. 1 is a cross sectional view of a split master cylinder such as is employed in today's vehicles and which incorporates a switching means in accordance with the principles of my invention.

With reference now to FIG. 1 there is shown a master cylinder 10 operated by a brake pedal 12 that is connected to a primary piston 14 within a longitudinal bore 16 of the housing 18 by a push rod 20. The housing 18 is formed with an annular wall 22 providing a reservoir cavity for the bore 16. This annular wall is divided by a partition 24 into separate reservoir chambers 26 and 28. These separate reservoir chambers communicate to the bore 16 by means of compensating ports 30 and 32 as well as fluid filling ports 34 and 36. Outlet ports 35 and 37 are provided to communicate fluid under pressure from the bore 16 to the front and rear wheels of the vehicle.

The reservoir cavity is closed by a cap 38 being urged to compress the peripheral and central portions of a sealing diaphragm 40 as by a bail 42.

Within the bore 16 a secondary piston 44 is located ahead of the primary piston 14 and spaced from the end of the bore by a return spring 46, as well as from the primary piston by a cage spring assembly 48. The cage spring assembly comprises a spring retainer 50, a spring 52 and a caging bolt 54 which is threaded as at 56 to the forward face of the primary piston. The spring 52 is thus held between a metallic retainer and a plastic seal retainer 58 for the double lip face seal 60 of the primary piston 14. A similar plastic retainer 62 insulates the return springs 46 from the primary piston 44 and maintains the position of the face seal 64 on the face of the secondary piston 44. The secondary piston 44 is slidingly supported within the bore 16 of the housing 18 by means of plastic rings 66 and 68. An electrical contact arm 70 is mounted through the housing 18 at the filler hole 34 by means of a plastic plug 72 having fluid passage means 74, and its contact with the surface of the secondary piston 44 is maintained by means of a leaf spring type connector 76 connected as at 78 to an external terminal through the annular wall 22 of the reservoir within the chamber 28. The secondary piston is provided with an insulated surface 80 adjacent its rearward face, or secondary seal 82, so that upon abnormal travel of the secondary piston 44 the electrical contact 70 is on the insulating ring 80. In the normal operation of the unit the electrical circuit, from the contact 70 and the secondary piston 44, is completed via switch arms 84 held in abutment with a metallic seal retaining plate 86 for the secondary piston 44 by the cage spring assembly 48.

Figure 2:
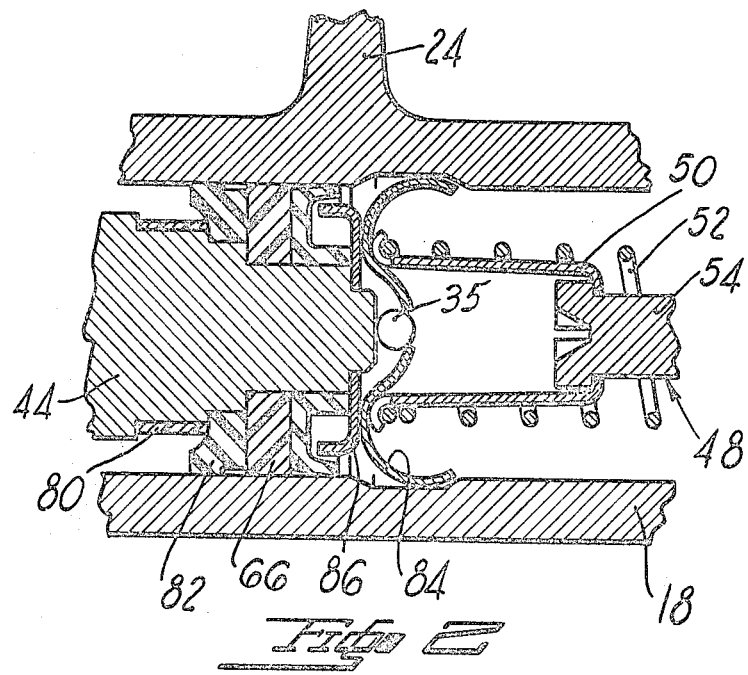
FIG. 2 is an enlarged view of the spring cage assembly connection with the secondary piston of the structure of FIG. 1.

This relationship is better shown in FIG. 2 which is an enlarged scale drawing of the area of the master cylinder of FIG. 1 where the cage spring assembly and the secondary piston are united.

Figure 3:
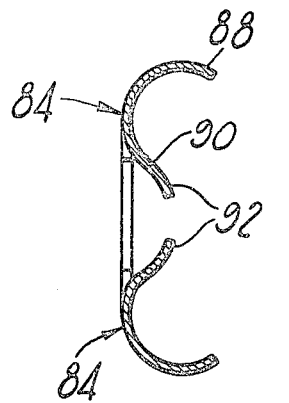
FIG. 3 is a cross sectional side view of a switch means in accordance with the principles of this invention to be utilized between the cage spring assembly and the secondary piston of FIG. 2 and FIG. 1.
Figure 4:
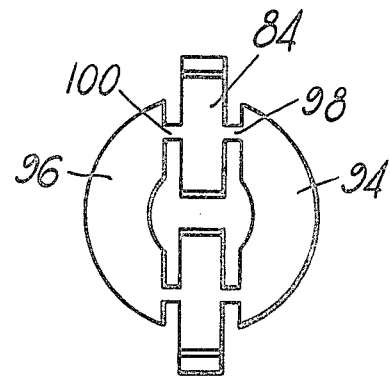
FIG. 4 is an end view of the switch means of FIG. 3.

The switch arm 84 is shown in FIGS. 3 and 4 to be constructed from a stamping having lever portions formed as arcuate members having an outer portion 88 for sliding contact with the walls of the bore 16 of the master cylinder, and an inner portion 90 curving toward the primary piston, as does the outer portions 88, towards the primary piston 14. The inner portion 90 then curves downwardly to provide a substantially flat abutment face 92 for contact with the head of the caging bolt 54 upon abnormal relative motion between the primary piston 14 and the secondary piston 44. The stamping is provided with two semi-circular portions 94 and 96 which are joined by flexure pivots 98 and 100 to the switch arms 84. The flexure pivots 98 and 100 are such as to resiliently bias the lever arm 84 outwardly where its outer portion 88 maintains the sliding relationship with the wall of the bore to complete the electrical circuit from the contact arm 70 via the secondary piston 44 to the housing 18 of the master cylinder.

It should be understood by those skilled in the art to which the invention relates that the master cylinder will be mounted to the structure of the vehicle so that the aforementioned circuit is completed from the appropriate side of the electrical power source.

OPERATION

In operation and assuming a normal operation, the operator of the vehicle will depress the brake pedal 12 to simultaneously actuate the primary and secondary pistons to terminate the communication from the reservoir chambers 26 and 28 by passing the face seals 60 and 64 beyond the compensating ports 30 and 32. Thereafter, pressure may be developed in the chamber between the primary and the secondary pistons as well as between the end of the bore 16 and the secondary piston 44 which is dependent upon the amount of force applied to the brake pedal 12.

In the event there is a failure in the braking system connected to the chamber between the secondary piston 44 and the end of the bore, the secondary piston 44 will be moved so that the electrical contact 70 is resting on the insulating surface 80 braking the electrical circuit via the master cylinder. As will be familiar to those skilled in the art, the warning device connected to the external terminal 78 will be thereby actuated to provide an indication of the failure in the master cylinder 10.

In the event of a failure in the brake system connected to the chamber between the primary and the secondary pistons, the caging bolt 54 will be moved to abut the faces 92 of the levers 84 and will cause the levers 84 to pivot so that the outer portions 88 will be removed from the side walls of the bore 16 to open the electrical circuit completed through the master cylinder housing 18, which, as aforementioned with regard to braking the electrical circuit with the insulating ring 80, open the electrical circuit via the master cylinder housing to actuate a warning device connected to the external terminal 78.

Having fully described an operative construction for this invention, it is now desired to set forth the intended protection sought by these Letters Patent by the appended claims.

I claim:
1. In a master cylinder:
a housing defining a bore therewithin;
a primary piston slidable in said bore;
a secondary piston slidable in said bore operatively connected to said primary piston;
a switch lever for controlling a warning device;
a pivot mounting said switch lever on said secondary piston;
said switch lever including a first portion extending from said pivot engaging the wall of the bore and a second portion extending from the pivot toward the primary piston;
said primary piston being adapted to contact said second portion upon abnormal relative movement between the pistons to pivot the lever thereby driving the first portion away from the wall of the bore.
2. The invention of claim 1:
said pivot being a resilient element yieldably biasing said first portion into engagement with said bore.
3. The invention of claim 1:
said pivot being a pair of torsionally resilient tabs interconnecting opposite sides of the lever with the secondary piston.
4. The invention of claim 3, and
a plate mounted on one end of the secondary piston; said tabs interconnecting the plate and the lever.
5. The invention of claim 1:
said first portion extending from said secondary piston in a direction radially outwardly from the axis of the bore;
said second portion extending radially inwardly from said pivot toward the center line of the bore.
6. The invention of claim 1:
a plate mounted on said secondary piston;
said lever being an arcuate element;
said pivot being a pair of tabs interconnecting the plate with opposite sides of the lever.
7. The invention of claim 6, and
a member projecting from one end of said primary piston adapted to engage said second portion upon said abnormal relative movement between the pistons.
8. The invention of claim 6:
said secondary piston having a projecting portion extending toward the primary piston;
said plate being mounted on said projecting portion.

References Cited

UNITED STATES PATENTS

| | | |
|---|---|---|
| 2,754,387 | 7/1956 | Favre. |
| 2,884,503 | 4/1959 | Connelly. |
| 3,062,934 | 11/1962 | Nijland. |
| 3,175,061 | 3/1965 | Roberts et al. _____ 200—82 |
| 3,255,319 | 6/1966 | Paine. |
| 3,301,987 | 1/1967 | Davis. |

ROBERT K. SCHAEFER, Primary Examiner

J. R. SCOTT, Assistant Examiner

U.S. Cl. X.R.

188—1